United States Patent
Allen et al.

(10) Patent No.: US 10,212,116 B2
(45) Date of Patent: Feb. 19, 2019

(54) INTELLIGENTLY CONDENSING TRANSCRIPT THREAD HISTORY INTO A SINGLE COMMON REDUCED INSTANCE

(71) Applicant: International Business Machines Corporation, Armonk, NY (US)

(72) Inventors: Corville O. Allen, Morrisville, NC (US); Mario A. Maldari, Lyons, CO (US); Monica Senior, College Park, GA (US); Paul A. Smith, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 14/868,445

(22) Filed: Sep. 29, 2015

(65) Prior Publication Data
US 2017/0093775 A1    Mar. 30, 2017

(51) Int. Cl.
| | |
|---|---|
| *G06F 15/16* | (2006.01) |
| *H04L 12/58* | (2006.01) |
| *H04L 29/06* | (2006.01) |
| *H04L 29/08* | (2006.01) |
| *G06Q 50/00* | (2012.01) |
| *G06Q 10/10* | (2012.01) |

(52) U.S. Cl.
CPC ........... *H04L 51/16* (2013.01); *G06Q 10/107* (2013.01); *G06Q 50/01* (2013.01); *H04L 67/2828* (2013.01); *H04L 69/04* (2013.01)

(58) Field of Classification Search
CPC ..... H04L 51/16; H04L 67/2828; H04L 67/02; H04L 69/04; H04L 51/12; H04L 51/04; G06Q 50/01; G06F 17/30867
See application file for complete search history.

(56) References Cited

U.S. PATENT DOCUMENTS

| | | | |
|---|---|---|---|
| 6,346,952 B1 * | 2/2002 | Shtivelman ........... | G06F 17/277 707/999.005 |
| 7,693,976 B2 * | 4/2010 | Perry .................... | H04L 7/0008 340/1.1 |

(Continued)

OTHER PUBLICATIONS

Shen, "Integrating Topic-centric Thread-based Organized Chat into Web-based Enterprise Instant Messengers", IEEE International Conference on E-Business Engineering, 2010, pp. 442-447.

(Continued)

*Primary Examiner* — Viet D Vu
(74) *Attorney, Agent, or Firm* — Michael A. Petrocelli

(57) ABSTRACT

A computer implemented method and system for condensing a communications thread which includes monitoring, using a computer, a communications thread. Multiple instances of a repeated portion of content of the communications thread are identified. One instance of the repeated portion of content of the communications thread is retained. One or more additional instances of the repeated portion of content is removed and stored. A reference link in the communications thread is associated to the repeated portion of content. The communications thread is condensed, wherein the condensed communications thread includes the one instance of the repeated portion of content, and the reference link.

19 Claims, 5 Drawing Sheets

(56) References Cited

U.S. PATENT DOCUMENTS

| | | | |
|---|---|---|---|
| 7,849,147 B2 * | 12/2010 | Rohall | G06Q 10/107 709/206 |
| 7,921,160 B2 * | 4/2011 | Malik | H04L 51/04 709/205 |
| 8,086,712 B2 * | 12/2011 | Sato | H04L 12/2821 709/223 |
| 8,296,278 B2 | 10/2012 | Abraham | |
| 8,495,147 B1 * | 7/2013 | Lang | G06Q 10/107 709/203 |
| 8,510,282 B2 | 8/2013 | Murali | |
| 8,677,360 B2 | 3/2014 | de Justo Teixeira et al. | |
| 8,683,351 B2 | 3/2014 | Cheng et al. | |
| 8,843,563 B1 | 9/2014 | Hartman | |
| 8,903,928 B2 * | 12/2014 | Staats | G06Q 10/107 709/205 |
| 9,256,699 B2 | 2/2016 | Heimes | |
| 9,391,933 B2 * | 7/2016 | Langholz | H04L 51/04 |
| 9,621,500 B2 * | 4/2017 | Hsiao | H04L 51/16 |
| 2003/0055903 A1 * | 3/2003 | Freed | H04L 51/12 709/206 |
| 2003/0061333 A1 * | 3/2003 | Dean | H04L 41/0253 709/223 |
| 2003/0126077 A1 * | 7/2003 | Kantor | G06Q 10/107 705/40 |
| 2004/0054737 A1 * | 3/2004 | Daniell | G06Q 10/107 709/206 |
| 2004/0215696 A1 * | 10/2004 | Fisher | G06Q 30/02 709/201 |
| 2005/0198247 A1 * | 9/2005 | Perry | H04L 7/0008 709/223 |
| 2005/0289474 A1 * | 12/2005 | Master | G06F 3/0481 715/765 |
| 2006/0031357 A1 | 2/2006 | Misra et al. | |
| 2006/0239221 A1 * | 10/2006 | Burns | H04W 4/12 370/328 |
| 2007/0033250 A1 | 2/2007 | Levin et al. | |
| 2007/0038710 A1 * | 2/2007 | Li | G06Q 10/107 709/206 |
| 2007/0118645 A1 * | 5/2007 | Suters | G06F 21/88 709/225 |
| 2007/0260681 A1 | 11/2007 | Jacovi et al. | |
| 2009/0307613 A1 * | 12/2009 | Essenmacher | G06Q 10/107 715/758 |
| 2009/0319628 A1 * | 12/2009 | Kumpula | H04L 12/58 709/206 |
| 2012/0246251 A1 | 9/2012 | Staats | |
| 2013/0124548 A1 | 5/2013 | Chhaparia et al. | |
| 2013/0290280 A1 | 10/2013 | Prahlad et al. | |
| 2014/0006498 A1 * | 1/2014 | Liu | H04L 67/02 709/204 |
| 2014/0223440 A1 | 8/2014 | Orschel | |
| 2014/0331156 A1 | 11/2014 | Kulikov | |
| 2014/0359577 A1 * | 12/2014 | Ceze | G06F 8/314 717/123 |
| 2015/0212984 A1 * | 7/2015 | Bowden | G06F 17/30867 715/234 |

OTHER PUBLICATIONS

Zhu et al., "Topic Detection for Discussion Threads with Domain Knowledge", 2010 IEEE/WIC/ACM International Conference on Web Intelligence and Intelligent Agent Technology, pp. 545-548.

Hansen et al., "Visualizing Threaded Conversation Networks: Mining Message Boards and Email Lists for Actionable Insights", AMT 2010, LNCS 6335, pp. 47-62.

* cited by examiner

US 10,212,116 B2

INTELLIGENTLY CONDENSING TRANSCRIPT THREAD HISTORY INTO A SINGLE COMMON REDUCED INSTANCE

BACKGROUND

The present disclosure relates to a computer implemented communications, and more particularly, identifying and editing a communications thread. A thread can refer to computer generated communications. The communications can include a message, an email or a text message, including any type of electronic message or messaging that generates a thread of communications. The thread typically, for example, starts with an original communication, message, or post, and a series of corresponding responses and intercommunications. In threaded discussions, which for example, can include a chat, email, or a forum hosted on a network or a website available on the World Wide Web (WWW), the thread can often repeat text throughout a discussion. The thread can become large, which can be due to repeated text. The thread can be cumbersome for a user to scroll through, for example, to manage and find desired content. Further, a thread that has grown in size can require more storage space, for instance, emails on an email server. In one example, an email server can lock a user out because of the storage requirements of their emails. The user can be prevented from sending an email because they have exceeded the capacity of their allocated email storage space. In one example, a user will be required to delete emails or archive emails to reduce the size of their mail in order to free storage space and unlock their account for usage.

SUMMARY

According to an aspect of the present invention, a computer implemented method for condensing a communications thread includes monitoring, using a computer, a communications thread. Multiple instances of a repeated portion of content of the communications thread are identified. One instance of the repeated portion of content of the communications thread is retained. One or more additional instances of the repeated portion of content is removed and stored. A reference link in the communications thread is associated to the repeated portion of content. The communications thread is condensed, wherein the condensed communications thread includes the one instance of the repeated portion of content, and the reference link.

In another aspect according to the invention, a computer program product for condensing a communications thread includes a computer readable storage medium having program instructions embodied therewith. The computer readable storage medium is not a transitory signal per se, and the program instructions are executable by a computer to cause the computer to perform a method, including: monitoring, using a computer, a communications thread; identifying multiple instances of a repeated portion of content of the communications thread; retaining one instance of the repeated portion of content of the communications thread; removing and storing an additional instance of the repeated portion of content; associating a reference link in the communications thread to the repeated portion of content; condensing the communications thread, wherein the condensed communications thread includes the one instance of the repeated portion of content, and the reference link.

In another aspect according to the present invention, a computer system for condensing a communications thread includes one or more computer processors, one or more computer-readable storage media, and program instructions stored on one or more of the computer-readable storage media for execution by at least one of the one or more processors. The program instructions include: monitoring, using a computer, a communications thread; identifying multiple instances of a repeated portion of content of the communications thread; retaining one instance of the repeated portion of content of the communications thread; removing and storing an additional instance of the repeated portion of content; associating a reference link in the communications thread to the repeated portion of content; condensing the communications thread, wherein the condensed communications thread includes the one instance of the repeated portion of content, and the reference link.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawing are discussed forthwith below.

DETAILED DESCRIPTION

Figure 1:
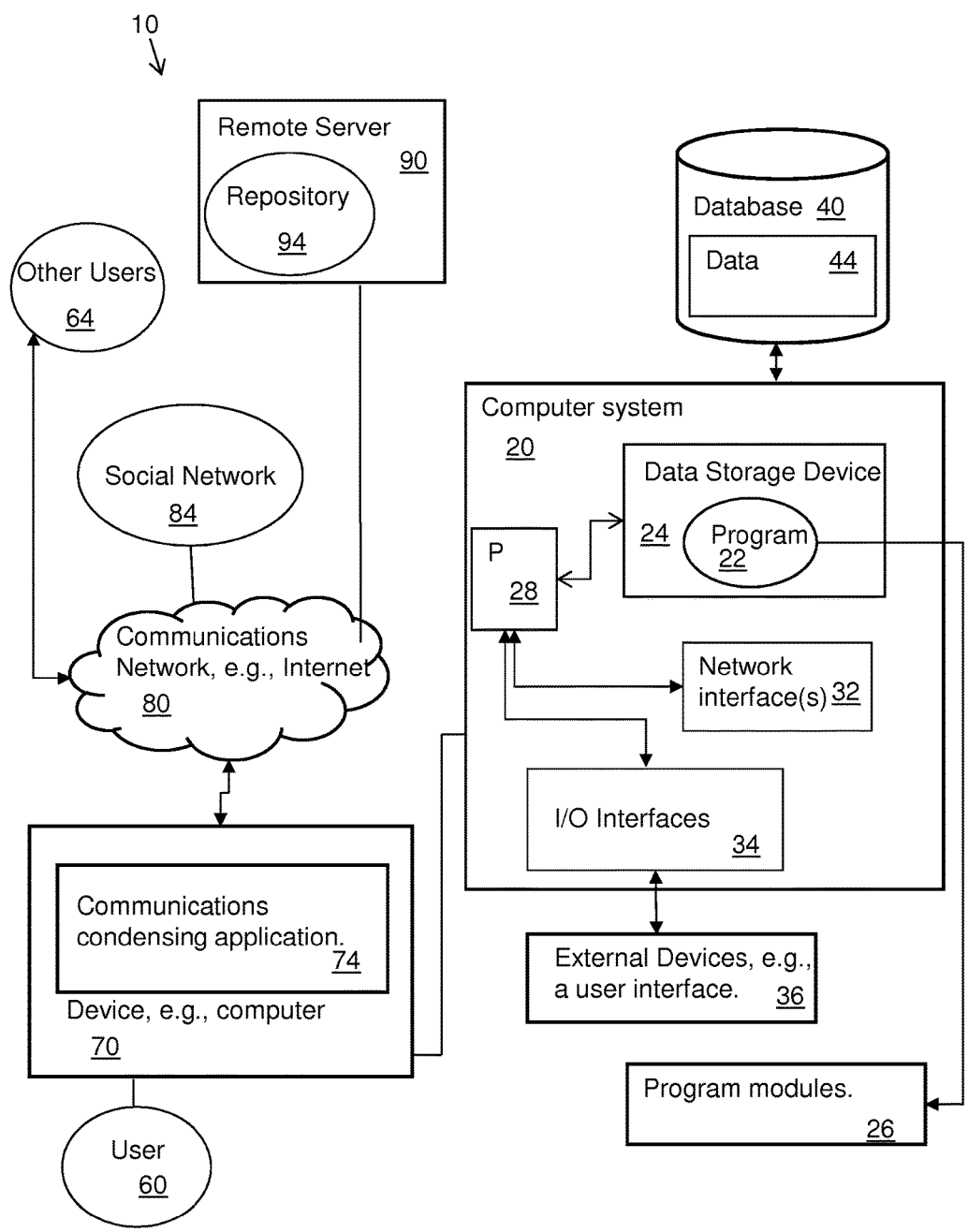
FIG. 1 is a schematic block diagram illustrating an overview of a system and methodology for condensing a communications thread according to an embodiment of the disclosure.
Figure 2A:
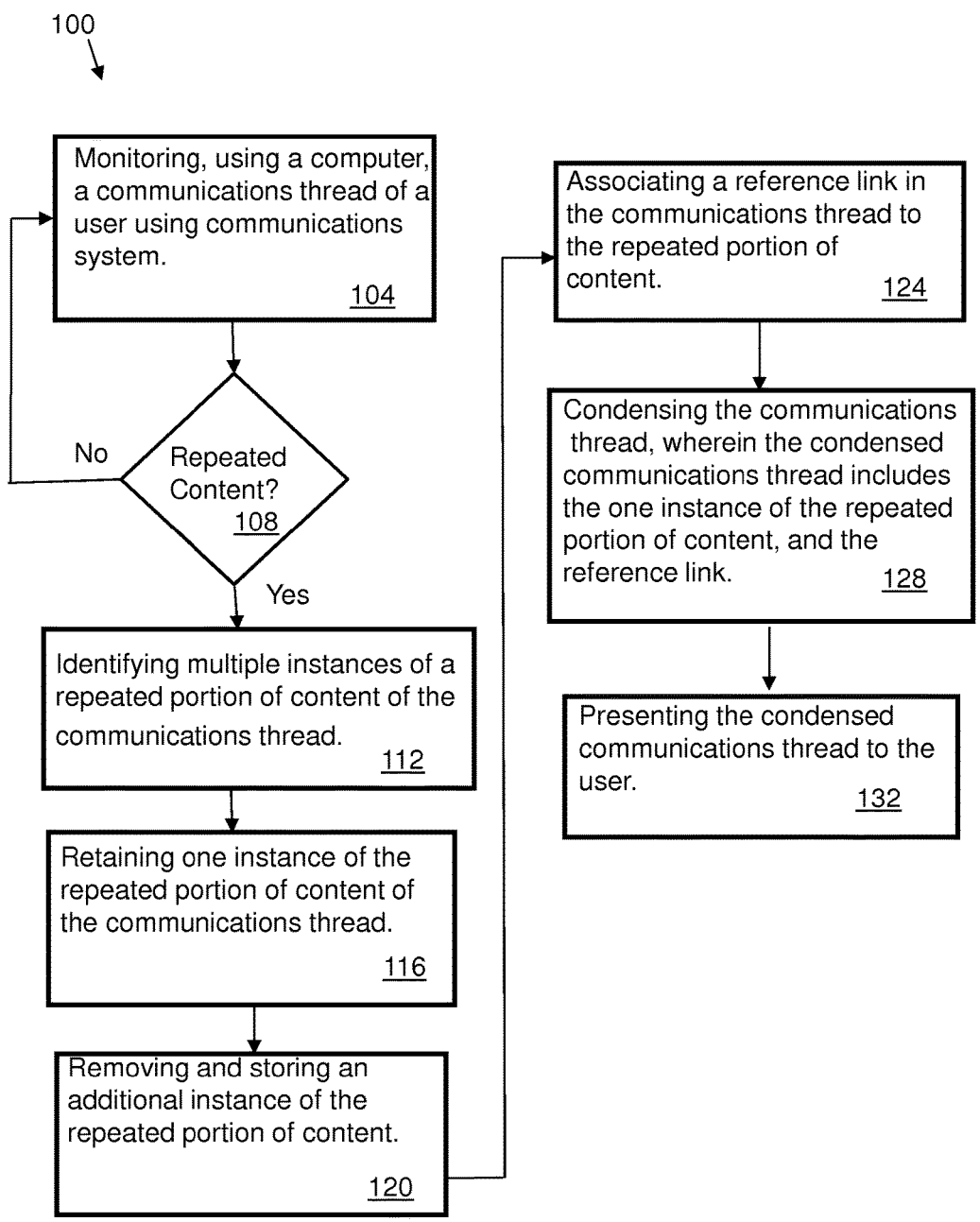
FIG. 2A is a flow chart illustrating a method for condensing a communications thread using the system shown in FIG. 1, according to an embodiment of the disclosure.
Figure 3:
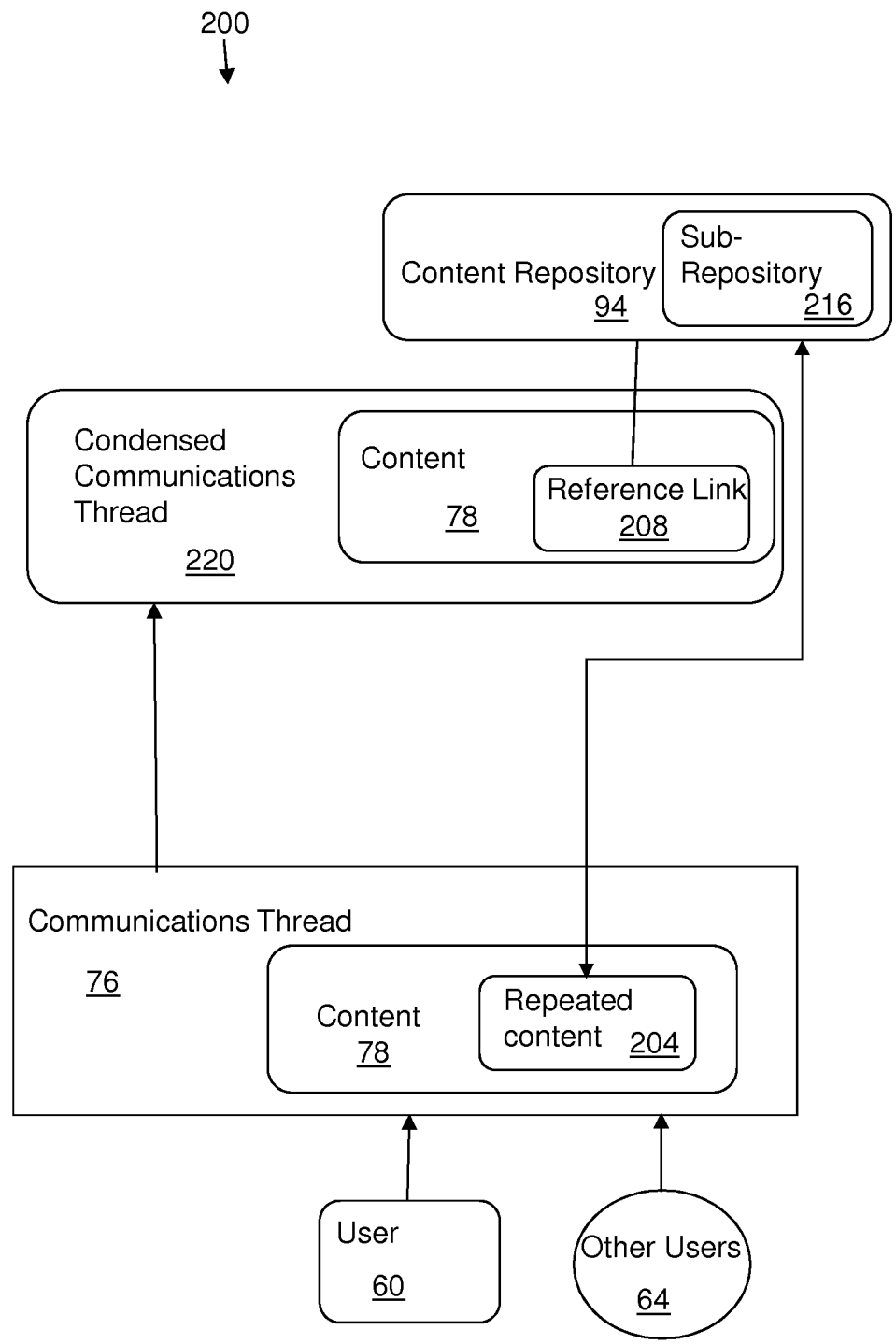
FIG. 3 is a functional schematic block diagram depicting a process for condensing a communications thread according to the method and system shown in FIGS. 1 and 2, according to an embodiment of the disclosure.

Referring to FIGS. 1, 2A and 3 a system 10 and method 100 according to an embodiment of the present disclosure for condensing a communications thread includes monitoring, using a computer, a communications thread 76 of a user 60, as in block 104. The user 60 can user a computer embodies as a device 70. The device may include a mobile device or a laptop computer (other alternative devices are discussed below). The user 60 can initiate a communications thread which includes content 78, for instance, an email, a post on a social network, or a message, using a communications system or network 80, which can include for example, the Internet, a telephone system, or a local or wide area network. Other users 64 can also access the communications network and carry on an exchange with the user, in one instance, accessing a social network 84, leading to a series of communications in a thread, or multiple threads.

The device 70 includes a computer system 20. The computer system 20 shown in FIG. 1 is representative of a computer system whining or accessed by the device, and is understood to also represent a remote computer system. The computer system 20 is discussed in greater detail herein below. The device 70 in the present embodiment includes a software application embodying the present method as a communications condensing application 74. The device 70 can also access the application 74 remotely, or be part of a communications application, for example an email application, or part social network application in other embodiments.

Block 108 includes determining if there is repeated content 204 in the communication thread. If not, the method returns to block 104 to monitor the communication threads of a user. If there is determined to be repeated content in the communications thread, the method proceeds to block 112. In one example, the communications thread can be parsed to identify the repeated portion of content.

Block 112 of the method 100 includes identifying multiple instances of a repeated portion of content of the communications thread.

One instance of the repeated portion of content of the communications thread is retained in the communications thread, as in block 116. It is understood that a repeated portion can be repeated one or more times in the communications content. The repeated portion can be repeated, for example, as in a reply to an email that incorporates the previous content or text, or when a user quotes or repeats a selected portion of the content or text in generating new message or post.

The method 100 removes and stores an additional instance of the repeated portion of content, as in block 120. The additional instance can include one or more instances of the repeated portion. The repeated additional portion of the content can be stored remotely, such that the repeated portion is accessible in response to a user request.

In one embodiment, the text of one or more threads can be analyzed for similar content, for example, common or repeated text, quotes, or references, or attachments. For instance, a reply to an original thread can include repeated content, text, or attachments. The repeated or duplicative content (also referred to as common content) (e.g., including text, photos,) is identified. The repeated content is removed and stored in a repository 94, as shown in the system shown in FIG. 1 and the functional system 200 shown in FIG. 3. An entry in the repository can be saved indicating a location for the removed repeated content (also referred to as an additional instance).

The content in the repository 94 can be constantly adjusted by consolidating common or repeated content in the repository into a sub-repository 216. The repeated content in the sub-repository can be referenced to the content in the repository 94.

A reference link 208 to the removed and stored repeated content is embedded in the condensed communications thread 220. The reference link is associated with the repeated portion of content which has been removed and stored, as in block 124. Thus, the method can generate an associated reference link in the communications thread. The associated reference link can be embedded in the content of the communications thread. The associated reference link can be located in the content at the location of the removed and stored additional instance of the repeated portion of content.

A reference link 208 to the removed and stored content can be provided at the same position in the text where the common text originally occurred and is now removed, for instance, at a location in the thread (wherein the thread may include a series of posts and responses) where the content has been removed and stored. The reference link can also be visualized for a user when a user moves a mouse over the location of the link or the link can be shown in a side window.

The communication thread is condensed by removing the repetitive content, as in block 128. The condensed communications thread includes the one instance of the repeated portion of content, and the reference link. The condensed communications thread continues to be accessible on the electronic communications system for the user. The condensed communication thread is thereby shorter than the original communications thread, requires less storage space and is easier for the user to manage, e.g., find information and read through.

The condensed communications thread in presented to the user in block 132. The condensed communications thread includes the one instance of the repeated portion of content, and the reference link.

In response to a user selecting the reference link, the repeated portion of the content is provided to the user from storage.

In one instance, the original communications thread can be deleted or archived, as the new condensed communications thread is available to the user.

In another example, multiple repeated portions of content are each associated with multiple links, respectively. The links can be included in condensed communication threads for each of a plurality of users. The communications threads can be different and customized for each of the users based on their interaction in the communications. For instance, whether a user was included in the an exchange would determine how their respective thread is organized or completed, and then condensed or compressed, and presented.

In one embodiment according to the present disclosure, a method includes a content repository which receives communications from a user and monitors their communications. In this embodiment the content repository is being used as a buffer to store and parse the communications. For example, a user can communicate using posts, threads or emails. The content repository parses the communications for repeated content, and sends the repeated content to a sub-repository, replacing the repeated content with a link to the content in the sub-repository similar to the previously described embodiment.

In one embodiment the method of the present disclosure can be implemented in response to a user selecting the condensing application as an option. In another instance, the condensing application can be implemented automatically.

In one instance, multiple threads can be condensed wherein the plurality of communications threads include a common set of users. For example, user A, user B, and user C, are in an original communications thread, and user B and user C continue additional communications, all the communications threads including users A, B, and C can be condensed. Moreover, in another example, if user A is subsequently included in the thread between users B and C, the communications thread for user A will be different from the communications thread for users B and C. Further, the condensed communications threads will be different for user A and users B and C, even though each of the condensed communications threads can share common reference links to repeated portions of content.

Figure 2B:
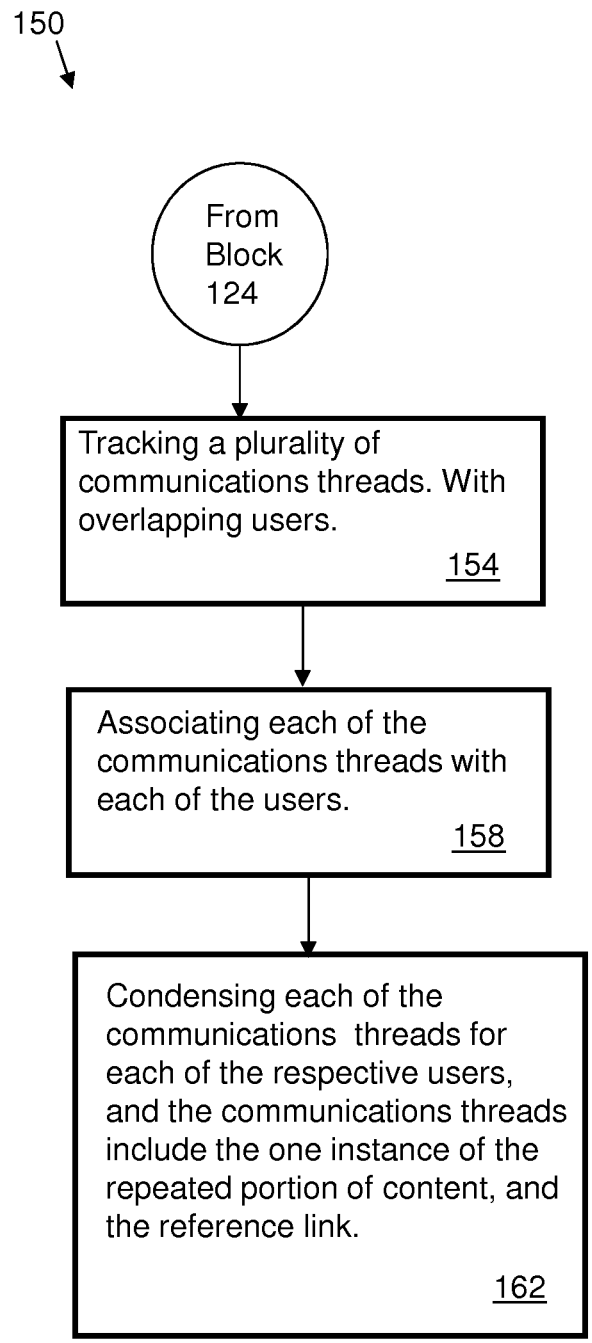
FIG. 2B is a flow chart illustrating a method for condensing multiple communications threads as an alternative embodiment from FIG. 2A, according to an embodiment of the disclosure.

More specifically, referring to the above example, and referring to FIG. 2B, an alternative embodiment according to the method 150 continues from block 124 of method 100 (FIG. 2A). The method 150 includes tracking a plurality of communications threads with overlapping users, as in block 154, and associating each of the plurality of communications threads with each of the users, respectively, as in block 158. The method further includes condensing each of the communications threads for each of the respective users, and the condensed communications threads include the one instance of the repeated portion of content, and the reference link, as in block 162.

In one embodiment according to the present disclosure, the method can further condense the content in storage, e.g., a repository, and store content in sub-storage, e.g., a sub-repository. The steps include analyzing the stored content in the repository for common content. Metadata can be generated for the repeated content. Common content of the content in the repository can be stored in a sub-repository. The metadata is associated to the common content in the sub-repository. The common content in the sub-repository can be retrieved using the metadata, in response to a user selecting the reference link in the communications thread to the repeated portion of content.

In one embodiment, the repeated portion of content can include, common text, common conclusions, common quotes, or common attachments, in one or more communications threads.

Figure 4:
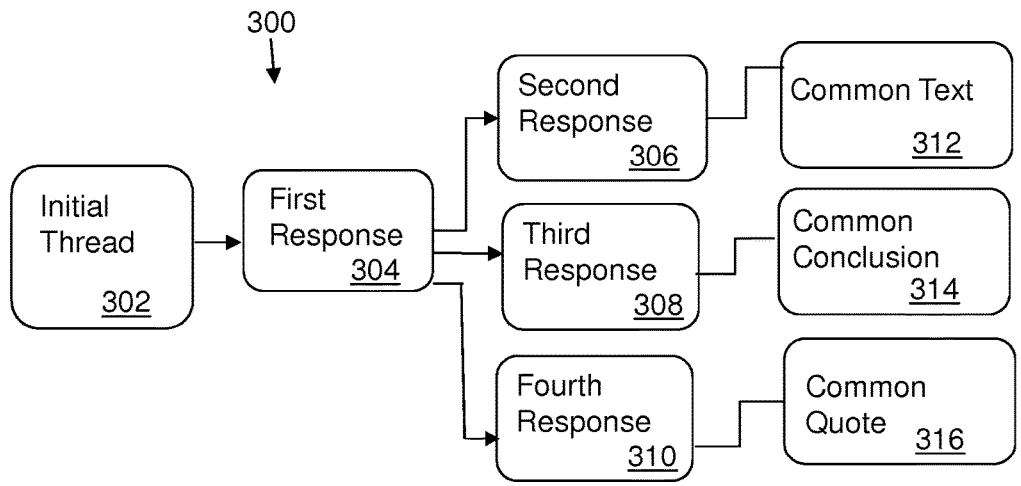
FIG. 4 is a functional schematic block diagram depicting a communications thread with multiple sources or responses according to an embodiment of the disclosure, and with respect to the embodiments shown in FIGS. 1, 2A, 2B, and 3.
Figure 5:
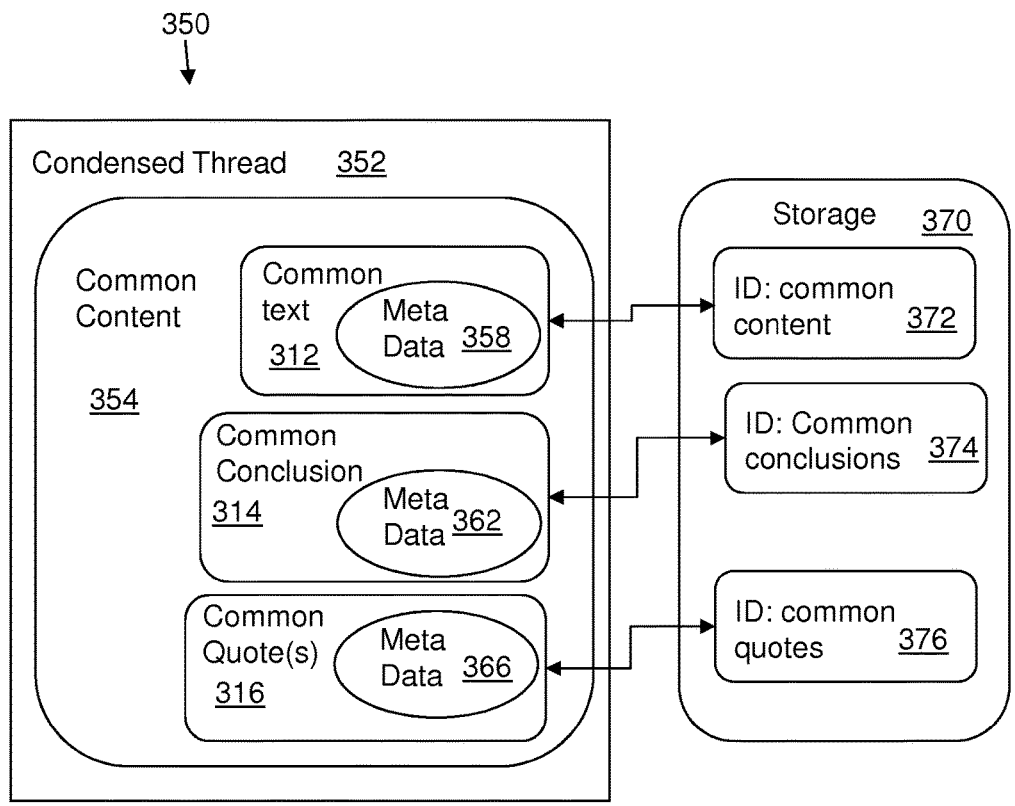
FIG. 5 is a schematic block diagram depicting a functional system for condensing a communications thread according to an embodiment of the disclosure, and with respect to the embodiments shown in FIGS. 1, 2A, 2B, 3, and 4.

Referring to FIGS. 4 and 5, in an embodiment according to the present disclosure, an initial thread 302 is generated by a user and a process 300 of intercommunications or continued communications is depicted. A first response 304 can be from another user, and other responses follow. For example, a second response 306 can include common text 312 with the initial thread or the first response or both. It is understood that common text is synonymous with repeated text or content as used in this disclosure. Similarly, a third response 308 can include a common or repeated conclusion 314 with the initial thread or one or more of the other responses. A fourth response 310 can include a common or repeated quote with the initial thread or one or more of the other responses.

According to the present disclosure, a condensed thread 352 is shown in FIG. 5 and a process 350 of interaction with condensed content is depicted. A condensed thread 352 includes common content 354. The common content is reduced to one instance of the common content 354. The common content 354 includes one instance of common text 312 with meta data 358. The common text 312 could have been in more than one response as depicted in the process 300 shown in FIG. 4. The other instances of the common text 312, for example, common quotes 316 and common conclusions 314, are stored in storage device 370 and associated to the original or single instance of the common text 312 in the condensed thread 352 using an identification (ID) 372. The ID can provide the ability to associate the stored content with a reference link that can be embedded in the condensed thread for retrieving the original content, as is described herein above. Meta data 358 is associated with the common text 312 to identify the common text, for example, identify the text's origin, the text's originating user, and to determine where in the original content the common text originated.

Similarly, a common conclusion 314 includes meta data 362. An ID 374 for other instances of the common conclusion is generated. A common quotes 316 includes meta data 366. An ID 376 for other instances of the common quote is shown in storage device 370.

Thereby, the method and system of the present disclosure provides the ability to identify repeated content or common content in one or more communications threads. The method of the present disclosure can also be implemented to parse specified content, for example, specific topics, text including keywords, specific text, specified graphics and associated text, and the like. Such identified specified content can be identified and condensed into a single document, and or, identified to a user, for example, highlighted, for the users ease in finding the identified content.

The present disclosure provides embodiments which include a method and system which scans through a thread or multiple similar threaded discussions and find common content that is repeatable. The data and information is condensed to enable a smaller storage of content and shorter (or less lengthy) visualization of the content of the thread(s). Embodiments of the method and system can intelligently denote which part of the discussion a user has already seen. Further embodiments can detect common text segments within the threads and can augment and remove them dynamically.

In one embodiment, a parse algorithm program can be run by analyzing the common content that pertains to a thread or similar threads. Once the common content is established, the algorithm then takes all the similar content, generate a single instance of a history content of the email, which reduces the size of the content. Thus, one instance of the common content and a single representation of the content history is provided which can be less content in content length and less data for storage.

Advantages of the method and system of the present disclosure can include needing less storage requirements for storing communications, such as, email. Further, the method and system of the present disclosure can provide an indication of the most relevant information from a thread, thus helping the user see and find relevant context.

In one embodiment, the method and system of the present disclosure can indicate the origination of portions of text, which can include a reference link to the original text in a thread.

The present disclosure provides a method and system to condense and reduce this size of a communications thread, thereby requiring smaller storage requirements, and providing efficiency and a manageability to a user.

Embodiments of the method and system of the present disclosure can automatically identify certain email threads, parse out common content, reduce the size of the thread by reducing the mail in that thread, and generate a single instance of the thread including the history of the content of the email.

The method and system of the present disclosure includes identifying commonalities from communication threads, e.g., email threads, and condensing one or more threads into a thread, e.g., email thread, including the thread history (e.g., without duplication of text).

The method 100 can be implemented using the communications condensing application 74 as shown in FIG. 1. The method can also be provided as a service which can be remote, for instance, including an application residing on a remote server exemplified by remote server 90.

The device or computer 70 may also be a mobile device. A mobile device is one embodiment of a device having a computer or computer system 20, which is depicted generically in FIG. 1. Other devices having a computer or described as a computer or computer system may include, for example, a Personal Data Assistant (PDA), a cell phone, or a notebook, a desktop computer, or the like. The device in the present disclosure can be configured to send and receive electronic communications. The computer system 20 is a generic representation of a computer which may be embodied in a device such as a hand held device, or can also represent a server for providing the method of the present disclosure as a service which can be accessible using the Internet or a network 80.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 90 which is accessed using the communications network 80.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for condensing a communications thread, comprising:
   monitoring, using a computer, a communications thread;
   identifying multiple instances of a repeated portion of content of the communications thread;
   retaining one instance of the repeated portion of content of the communications thread;
   removing and storing an additional instance of the repeated portion of content, the computer storing the additional instance of the repeated portion of content remotely in a repository of a remote server, the remote server being in communication with the computer via a communications network;
   associating a reference link in the communications thread to the repeated portion of content;
   condensing the communications thread, wherein the condensed communications thread includes the one instance of the repeated portion of content, and the reference link;
   creating an entry in the repository for the removed additional instance of the repeated portion of content; and
   generating the associated reference link in the communications thread, the associated reference link being embedded in content of the communications thread, and the associated reference link being at a location in the content of the removed and stored additional instance of the repeated portion of content.

2. The method of claim 1, further comprising:
   tracking a plurality of communications threads with overlapping users associating each of the plurality of communications threads with each of the users, respectively;
   condensing each of the communications threads for each of the respective users, wherein the condensed communications threads include the one instance of the repeated portion of content, and the reference link.

3. The method of claim 1, wherein the communication thread is initiated from a user using a computer to access a communications system, and the method further comprising:
   presenting the condense communications thread to the user.

4. The method of claim 1, further comprising:
   archiving or deleting from an electronic communications system the communications thread, wherein the condensed communications thread continues to be accessible on the electronic communications system.

5. The method of claim 1, further comprising:
   providing the repeated portion of content, in response to receiving a selection of the reference link.

6. The method of claim 1, further comprising:
   parsing the communications thread to identify the repeated portion of content.

7. The method of claim 1, wherein the communications thread includes a series of electronic communications.

8. The method of claim 1, wherein the communications thread includes one or more of an email, a message, a post.

9. The method of claim 1, further comprising:
   monitoring, using a computer, a plurality of communications threads.

10. The method of claim 9, wherein the plurality of communications threads include a common set of users.

11. The method of claim 1, wherein the repeated portion of content includes: common text, common conclusions, common quotes, or common attachments, in one or more communications threads.

12. The method of claim 1, further comprising:
analyzing the additional instance of the repeated portion of content stored for common content;
generating metadata for the repeated portion of content;
storing the common content in sub-storage;
associating the metadata to the common content in the sub-storage; and
retrieving the common content in the sub-storage using the metadata, in response to a user selecting the reference link in the communications thread to the repeated portion of content.

13. A computer program product for condensing a communications thread, the computer program product comprising a computer readable storage medium having program instructions embodied therewith, wherein the computer readable storage medium is not a transitory signal per se, the program instructions executable by a computer to cause the computer to perform a method, comprising:
monitoring, using a computer, a communications thread;
identifying multiple instances of a repeated portion of content of the communications thread;
retaining one instance of the repeated portion of content of the communications thread;
removing and storing an additional instance of the repeated portion of content, the computer storing the additional instance of the repeated portion of content remotely in a repository of a remote server, the remote server being in communication with the computer via a communications network;
associating a reference link in the communications thread to the repeated portion of content;
condensing the communications thread, wherein the condensed communications thread includes the one instance of the repeated portion of content, and the reference link;
creating an entry in the repository for the removed additional instance of the repeated portion of content; and
generating the associated reference link in the communications thread, the associated reference link being embedded in content of the communications thread, and the associated reference link being at a location in the content of the removed and stored additional instance of the repeated portion of content.

14. The computer program product of claim 13, further comprising:
tracking a plurality of communications threads with overlapping users associating each of the plurality of communications threads with each of the users, respectively;
condensing each of the communications threads for each of the respective users, wherein the condensed communications threads include the one instance of the repeated portion of content, and the reference link.

15. The computer program product of claim 13, wherein the communication thread is initiated from a user using a computer to access a communications system, and the method further comprising:
presenting the condense communications thread to the user.

16. The computer program product of claim 13, further comprising:
archiving or deleting from an electronic communications system the communications thread, wherein the condensed communications thread continues to be accessible on the electronic communications system.

17. A computer system for condensing a communications thread, the computer system comprising:
one or more computer processors, one or more computer-readable storage media, and program instructions stored on one or more of the computer-readable storage media for execution by at least one of the one or more processors, the program instructions, comprising:
monitoring, using a computer, a communications thread;
identifying multiple instances of a repeated portion of content of the communications thread;
retaining one instance of the repeated portion of content of the communications thread;
removing and storing an additional instance of the repeated portion of content, the computer storing the additional instance of the repeated portion of content remotely in a repository of a remote server, the remote server being in communication with the computer via a communications network;
associating a reference link in the communications thread to the repeated portion of content;
condensing the communications thread, wherein the condensed communications thread includes the one instance of the repeated portion of content, and the reference link;
creating an entry in the repository for the removed additional instance of the repeated portion of content; and
generating the associated reference link in the communications thread, the associated reference link being embedded in content of the communications thread, and the associated reference link being at a location in the content of the removed and stored additional instance of the repeated portion of content.

18. The system of claim 17, further comprising:
tracking a plurality of communications threads with overlapping users associating each of the plurality of communications threads with each of the users, respectively;
condensing each of the communications threads for each of the respective users, wherein the condensed communications threads include the one instance of the repeated portion of content, and the reference link.

19. The system of claim 17, wherein the communication thread is initiated from a user using a computer to access a communications system, and the method further comprising:
presenting the condense communications thread to the user.

* * * * *